United States Patent
Whaley et al.

(10) Patent No.: US 7,184,555 B2
(45) Date of Patent: Feb. 27, 2007

(54) QUANTUM COMPUTATION

(75) Inventors: K. Birgit Whaley, Berkeley, CA (US); Daniel A. Lidar, Toronto (CA); Julia Kempe, Berkeley, CA (US); David Bacon, Pasadena, CA (US)

(73) Assignee: Magiq Technologies, Inc., New York, NY (US)

( * ) Notice: Subject to any disclaimer, the term of this patent is extended or adjusted under 35 U.S.C. 154(b) by 894 days.

(21) Appl. No.: 10/118,934

(22) Filed: Apr. 10, 2002

(65) Prior Publication Data

US 2003/0023651 A1 Jan. 30, 2003

Related U.S. Application Data

(60) Provisional application No. 60/283,016, filed on Apr. 11, 2001.

(51) Int. Cl.
*H04L 9/00* (2006.01)
*H03M 13/00* (2006.01)

(52) U.S. Cl. .................. 380/278; 380/256; 714/781

(58) Field of Classification Search .............. 380/278, 380/256; 714/781
See application file for complete search history.

(56) References Cited

U.S. PATENT DOCUMENTS

| | | | |
|---|---|---|---|
| 4,419,579 A | 12/1983 | East | |
| 4,476,384 A | 10/1984 | Westphal | |
| 4,648,133 A | 3/1987 | Vilnrotter | |
| 4,833,633 A | 5/1989 | Morris | |
| 4,843,328 A | 6/1989 | Greenhall | |
| 5,243,649 A | 9/1993 | Franson | |
| 5,307,410 A | 4/1994 | Bennett | |
| 5,339,182 A | 8/1994 | Kimble et al. | |
| 5,418,905 A | 5/1995 | Rarity et al. | |
| 5,515,438 A | 5/1996 | Bennett et al. | |

(Continued)

FOREIGN PATENT DOCUMENTS

JP 10-32259 2/1998

(Continued)

OTHER PUBLICATIONS

U.S. Appl. No. 09/780,477, filed Feb. 12, 2001, Akira Yamazaki et al. "Multi-Power Semiconductor Integrated Circuit Device".

(Continued)

*Primary Examiner*—Joseph D. Torres
(74) *Attorney, Agent, or Firm*—Opticus IP Law, PLLC

(57) ABSTRACT

The invention includes systems for and methods of performing quantum computation. The method of quantum computation includes preparing a set of one or more qubits capable of storing quantum information in $2^n$ possible states, wherein the number of qubits $n \geq 1$. The qubit set is subject to a decoherence mechanism that could cause a loss of quantum information stored in some but not all of the qubit states. The method also includes determining, via a quantum measurement of the qubit system or just by analyzing the decoherence of the qubit states, which of the $2^n$ states or their superposition is/are not susceptible to decoherence. The method further includes encoding and processing quantum information in one or more of the decoherence-free states by controlling qubit-qubit interactions or via an electromagnetic interaction with the set of qubits.

12 Claims, 2 Drawing Sheets

U.S. PATENT DOCUMENTS

| | | | |
|---|---|---|---|
| 5,568,301 | A | 10/1996 | Tiemann et al. |
| 5,570,222 | A | 10/1996 | Chovan |
| 5,675,648 | A | 10/1997 | Townsend |
| 5,732,139 | A | 3/1998 | Lo et al. |
| 5,757,912 | A | 5/1998 | Blow |
| 5,764,765 | A | 6/1998 | Phoenix et al. |
| 5,768,297 | A | 6/1998 | Shor |
| 5,768,378 | A | 6/1998 | Townsend et al. |
| 5,850,441 | A | 12/1998 | Townsend et al. |
| 5,953,421 | A | 9/1999 | Townsend |
| 5,987,483 | A | 11/1999 | Edelkind et al. |
| 5,999,285 | A | 12/1999 | Brandt et al. |
| 6,076,097 | A | 6/2000 | London et al. |
| 6,128,764 | A * | 10/2000 | Gottesman ................ 714/785 |
| 6,188,768 | B1 | 2/2001 | Bethune et al. |
| 6,218,657 | B1 | 4/2001 | Bethune et al. |
| 6,272,224 | B1 | 8/2001 | Mazourenko et al. |
| 6,289,104 | B1 | 9/2001 | Patterson et al. |
| 6,314,189 | B1 | 11/2001 | Motoyoshi et al. |
| 6,360,183 | B1 | 3/2002 | Shilton |
| 6,393,448 | B1 | 5/2002 | Dultz et al. |
| 6,438,234 | B1 | 8/2002 | Gisin et al. |
| 2001/0055389 | A1 | 12/2001 | Hughes et al. |
| 2002/0025041 | A1 | 2/2002 | Tomita |

FOREIGN PATENT DOCUMENTS

| | | |
|---|---|---|
| JP | 2000-339958 | 12/2000 |
| WO | WO 96/06491 | 2/1996 |
| WO | WO 97/44936 | 11/1997 |
| WO | WO 98/10560 | 3/1998 |
| WO | WO 02/091147 A1 | 5/2002 |

OTHER PUBLICATIONS

U.S. Appl. No. 60/025,839, filed Sep. 5, 1996, Gisin et al.
Townsend, "Quantum cryptography on official fiber networks," Optical Fiber Technology (1998).
Gottesman et al., "From Quantum Cheating to Quantum Security," Physics Today Online, Nov. 2000, www.physicstoday.org/pt/vol-53/iss-11/p22.html pp. 1-11.
Stucki et al., "Quantum Key Distribution over 67 km with a Plug&Play System," Mar. 22, 2002, http://xxx.lanl.gov/PS_cache/quant-ph/pdf/0203/0203118.pdf pp. 1-7.
Buttler et al., "New, Efficient and Robust, Fiber-based Quantum Key Distribution Schemes," Mar. 20, 2002, http://xxx.lanl.gov/PS_cache/quant-ph/pdf/0203/0203098.pdf pp. 1-4.
Gisin et al., "Quantum Cryptography," Sep. 18, 2001, http://xxx.lanl.gov/PS_cache/quant-ph/pdf/0101/0101098.pdf pp. 1-57.
Kempe et al., "Theory of Decoherance-Free Fault-tolerant Universal Quantum Computation," Apr. 19, 2000, http://xxx.lanl.gov/PS_cache/quant-ph/pdf/0004/0004064.pdf pp. 1-40.
Bennett et al., "Experimental Quantum Cryptography," J. Cryptology, vol. 5, pp. 3-28, 1992.
Brassard et al., "Secret Key Reconciliation by Public Discussion," Advances in Cryptology," Eurocrypt' 93 Proceedings, pp. 410-423, 1993.
Sugimoto et al., A study on Secret Key Reconciliation Protocol "Cascade," IEICE Trans. Fundamentals E83-A, pp. 1987-1991, Jan. 2000.
Bennett et al., "Generalized Privacy Amplification," IEEE Trans. on Information Theory, vol. 41, No. 6, pp. 1915-1923, Nov. 1995.
Maurer, "Secret Key Agreement by Public Discussion from Common Information," IEEE Trans. Inf. Theory vol. 39, No. 3, 733-742, May 1993.
Maurer et al., "Unconditionally Secure Key Agreement and the Intrinsic Conditional Information," IEEE Trans. Inf. Theory vol. 45, No. 2, 499-514, Mar. 1999.
Shor et al., "Simple proof of security of the BB84 quantum key distribution protocol," Phys. Rev. Lett. vol. 85, No. 2, pp. 441-444, Jul. 2000.
Mayers, "Unconditional security in quantum cryptography," Journal of the ACM, vol. 48, No. 3, pp. 351-406, May 2001.
Bennett et al., "Quantum cryptography: Public key distribution and coin tossing," Proceedings of IEEE International Conference on Computers, Systems, and Signal Processing, IEEE, pp. 175-179, Dec. 1984.
Ekert, "Quantum cryptography based on Bell's Theorem," Phys. Rev. Lett. vol. 67, pp. 661-663, Aug. 1991.
Bennett et al., "Mixed-state entanglement and quantum error correction," Phys. Rev. A, vol. 54, No. 5, pp. 3824-3851, Nov. 1996.
Bennett et al., "Purification of Noisy Entanglement and Faithful Teleportation via Noisy Channels," Phys. Rev. Lett., vol. 76, No. 5, pp. 722-725, Jan. 1991.
Deutsch et al., "Quantum Privacy Amplification and the Security of Quantum Cryptography over Noisy Channels," Phys. Rev. Lett. 77, 2818-2821, Sep. 1996; 80, No. 9, 2022, Mar. 1998 errata.
Mayers, preprint of, "Unconditional Security in Quantum Cryptography," Sep. 15, 1998, http://xxx.lanl.gov/PS_cache/quant-ph/pdf/9802/9802025.pdf pp. 1-18.
Lo et al., "Unconditional security of quantum key distribution over arbitrarily long distances," Science, vol. 283, (1999), pp. 2050-2056; also available at http://xxx.lanl.gov/PS_cache/quant-ph/pdf/9803/9803006.pdf pp. 1-21.
Biham et al., "A proof of security of quantum key distribution," Dec. 11, 1999, http://aps.arxiv.org/PS_cache/quant-ph/pdf/9912/9912053.pdf 31 pages.
Inamori et al., "Unconditional Security of Practical Quantum Key Distribution," Jul. 3, 2001 http://xxx.lanl.gov/PS_cache/quant-ph/pdf/0107/0107017.pdf pp. 1-47.
Gottesman et al., "Proof of security of quantum key distribution with two-way classical communications," May 23, 2001, http://xxx.lanl.gov/PS_cache/quant-ph/pdf/0105/0105121.pdf pp. 1-17.
Lo, "Proof of unconditional security of six-state quantum key distribution scheme," Quantum Information and Computation, vol. 1, No. 2, pp. 81-94, 2001.
Bennett et al., "Generalized Privacy Amplification," IEEE Transactions on Information Theory, vol. 41, No. 6, pp. 1915-1923, Nov. 1995).
Bruss, "Optimal eavesdropping in quantum cryptography with six states," Phys. Rev. Lett., vol. 81, No. 14, pp. 3018-3021, Oct. 1998.
Lo et al., "Efficient quantum key distribution scheme and proof of its unconditional security," Nov. 30, 2001, http://xxx.lanl.gov/PS_cache/quant-ph/pdf/0011/0011056.pdf pp. 1-32.
Gottesman et al., "Secure quantum key distribution using squeezed states," Sep. 25, 2000, http://xxx.lanl.gov/PS_cache/quant-ph/pdf/0008/0008046.pdf pp. 1-19.
Calderbank et al., "Good Quantum error-correcting codes exist," Apr. 16, 1996, http://aps.arxiv.org/PS_cache/quant-ph/pdf/9512/9512032.pdf pp. 1-24.
Steane, "Multiple particle interference and quantum error correction," May 13, 1996, http://aps.arxiv.org/PS_cache/quant-ph/pdf/9601/9601029.pdf pp. 1-45.
Fuchs et al., "Optimal eavesdropping in quantum cryptography. I," Jan. 30, 1997, http://aps.arxiv.org/PS_cache/quant-ph/pdf/97010/9701039.pdf 29 pages.
Cirac et al., "Coherent eavesdropping strategies for the 4 state quantum cryptography protocol," Jan. 31, 1997, http://aps.arxiv.org/PS_cache/quant-ph/pdf/97020/9702002.pdf pp. 1-6.
Bennett et al., "Quantum Cryptography," Scientific American, pp. 50-57, Oct. 1992.
Bennett, "Quantum Cryptography Using Any Two Nonorthogonal States," Phys Rev Lett vol. 68, No. 21, pp. 3121-3124, May 1992.
Santori et al., "Triggered Single Photons from a Quantum Dot," Phys Rev Lett vol. 86, No. 8, pp. 1502-1505, Feb. 2001.
Townsend et al., "Enhanced Single Photon Fringe Visibility in a 10 km-Long Prototype Quantum Cryptography Channel," Electronics Letters vol. 29, No. 14, pp. 1291-1293, Jul. 1993.
Townsend, "Experimental Investigation of the Performance Limits for First Telecommunications-Window Quantum Cryptography Systems," IEEE Photonics Technology Letters vol. 10, No. 7, pp. 1048-1050, Jul. 1998.
Tittel et al., "Quantum Cryptography", Physics World vol. 3, pp. 41-45, Mar. 1998.

Chiangga et al., "Towards practical quantum cryptography," Appl Phys B 69, pp. 389-393, 1999.

Blow et al., "Continuum fields in quantum optics," Phys Rev A vol. 42, No. 7, pp. 4102-4114, Oct. 1990.

Braunstein et al., "Scalable quantum computers, paving the way to realization," Wiley-VCH, 2001, Abstract, see http://www.wiley-vch.de/books/tis/eng/3-527-40321-3.html pp. 1-3.

Shor, "Algorithms for Quantum Computation: Discrete Log and Factoring," Extended Abstract, pp. 1-14, 1994.

Grover, "Quantum Mechanics Helps in Searching for a Needle in a Haystack," Jul. 17, 1997 http://xxx.lanl.gov/PS_cache/quant-ph/pdf/9706/9706033.pdf.

Bennett et al., "Teleporting an Unknown Quantum State via Dual Classical and Einstein-Podolsky-Rosen Channels," Phys. Rev. Lett. vol. 70, No. 13, pp. 1895-1899, Mar. 1993.

Bennett et al., "Quantum Information Theory," IEEE Trans. Info. Theory vol. 44, No. 6, pp. 2724-2742, Oct. 1998.

Shor, "Scheme for reducing decoherence in quantum computer memory," Phys. Rev. A vol. 52, No. 4, pp. 2493-2496, Oct. 1995.

Steane, "Error Correcting Codes in Quantum Theory," Phys. Rev. Lett. vol. 77, No. 5, pp. 793-797, Jul. 1996.

Knill et al., "Theory of quantum error-correcting codes," Phys. Rev. A vol. 55, No. 2, pp. 900-911, Feb. 1997.

D. Gottesman, "A Class of Quantum Error-Correcting Codes Saturating the Quantum Hamming Bond," Jul. 24, 1996, http://xxx.lanl.gov/PS_cache/quant-ph/pdf/9604/9604038.pdf pp. 1-22.

Aharonov et al., "Fault-Tolerant Quantum Computation with Constant Error,"Nov. 15, 1996, http://xxx.lanl.gov/PS_cache/quant-ph/pdf/9611/9611025.pdf pp. 1-18.

Knill et al., "Resilient Quantum Computation," Science vol. 279, pp. 342-345, Jan. 1998.

Preskill, "Reliable quantum computers," Proc. R. Soc. Lond. A, vol. 454, pp. 385-410, 1998.

Palma et al., "Quantum Computers and Dissipation," Jan. 31, 1997, http://aps.arxiv.org/PS_cache/quant-ph/pdf/97020/9702001.pdf pp. 1-31.

Duan et al., "Preserving Coherence in Quantum Computation by Pairing the Quantum Bits," Oct. 3, 1997, http://aps.arxiv.org/PS_cache/quant-ph/pdf/97030/9703040.pdf pp. 1-13.

Duan et al., "Reducing decoherence in quantum-computer memory with all quantum bits coupling to the same environment," Phys. Rev. A vol. 57, No. 2, pp. 737-741, Feb. 1998.

Zanardi et al., "Error Avoiding Quantum Codes," Oct. 16, 1997, http://xxx.lanl.gov/PS_cache/quant-ph/pdf/9710/9710041.pdf pp. 1-9.

Zanardi, "Dissipative Dynamics in a Quantum Register," Aug. 25, 1997, http://xxx.lanl.gov/PS_cache/quant-ph/pdf/9708/9708042.pdf pp. 1-8.

Zanardi et al. "Noiseless Quantum Codes," Sep. 5, 1997, http://xxx.lanl.gov/PS_cache/quant-ph/pdf/9705/9705044.pdf pp. 1-4.

Zanardi, "Dissipation and Decoherence in a Quantum Register," Feb. 6, 1998, http://xxx.lanl.gov/PS_cache/quant-ph/pdf/9705/9705045.pdf pp. 1-10.

Lidar et al., "Decoherence Free Subspaces for Quantum Computation,"Jul. 28, 1998, http://xxx.lanl.gov/PS_cache/quant-ph/pdf/9807/9807004.pdf pp. 1-4.

Lidar et al., "Concatenating Decoherence Free Subspaces with Quantum Error Correcting Codes," Apr. 28, 1999, http://xxx.lanl.gov/PS_cache/quant-ph/pdf/9809/9809081.pdf pp. 1-4.

Lidar et al., "Decoherence-Free Subspaces for Multiple-Qubit Errors. (I) Characterization," Phys. Rev. A, vol. 63, 022306, pp. 1-13, 2001.

Bacon et al., "Robustness of Decoherence-Free Subspaces for Quantum Computation," Jun. 15, 1999, http://xxx.lanl.gov/PS_cache/quant-ph/pdf/9902/9902041.pdf pp. 1-16.

Lidar et al., "Protecting Quantum Information Encoded in Decoherence Free States Against Exchange Errors," Dec. 2, 1999, http://xxx.lanl.gov/PS_cache/quant-ph/pdf/9907/9907096.pdf pp. 1-7.

Durdevich et al., "Generalized Noiseless Quantum Codes Utilizing Quantum Enveloping Algebras," Mar. 29, 2000, http://xxx.lanl.gov/PS_cache/quant-ph/pdf/0003/0003134.pdf pp. 1-16.

Zanardi et al., "Quantum Information in Semiconductors: Noiseless Encoding in a Quantum-Dot Array," Nov. 20, 1998, http://xxx.lanl.gov/PS_cache/quant-ph/pdf/9804/9804016.pdf pp. 1-5.

Zanardi et al., "Subdecoherent Information Encoding in a Quantum-Dot Array," Nov. 19, 1998, http://xxx.lanl.gov/PS_cache/quant-ph/pdf/9808/9808036.pdf pp. 1-17.

Zanardi, "Computation on a Noiseless Quantum Code and Symmetrization," Jun. 9, 1999, http://xxx.lanl.gov/PS_cache/quant-ph/pdf/9901/9901047.pdf pp. 1-4.

Beige et al., "Driving Atoms Into Decoherence-Free States," Jun. 30, 2000, http://xxx.lanl.gov/PS_cache/quant-ph/pdf/9912/9912004.pdf pp. 1-12.

Beige et al., "Quantum Computing Using Dissipation to Remain in a Decoherence-Free Subspace," Jul. 4, 2000, http://xxx.lanl.gov/PS_cache/quant-ph/pdf/0004/0004043.pdf pp. 1-5.

Bacon et al., "Universal Fault-Tolerant Computation on Decoherence-Free Subspaces," Jun. 29, 2000, http://xxx.lanl.gov/PS_cache/quant-ph/pdf/9909/9909058.pdf pp. 1-5.

Deutsch et al., "Universality in Quantum Computation," May 24, 1995, http://xxx.lanl.gov/PS_cache/quant-ph/pdf/95050/9505018.pdf pp. 1-11.

Barenco, "A Universal Two-Bit Gate for Quantum Computation," May 24, 1995, http://xxx.lanl.gov/PS_cache/quant-ph/pdf/95050/9505016.pdf pp. 1-4.

DiVincenzo, "Two-bit gates are universal for quantum computation," Phys. Rev. A vol. 51, No. 2, pp. 1015-1022, Feb. 1995.

Lloyd, "Almost Any Quantum Logic Gate is Universal," Phys. Rev. Lett. A vol. 75, No. 2, pp. 346-349, Jul. 1995.

Sleator et al., "Realizable Universal Quantum Logic Gates," Phys. Rev. Lett. vol. 74, No. 20, pp. 4087-4090, May 1995.

Duan et al., "Quantum Error Avoiding Codes Versus Quantum Error Correcting Codes," Sep. 19, 1998, http://xxx.lanl.gov/PS_cache/quant-ph/pdf/9809/9809057.pdf pp. 1-13.

Knill et al., "Theory of quantum error correction for general noise," Phys. Rev. Lett. vol. 84, No. 11, pp. 2525-2528, Mar. 2000.

Viola et al., "Dynamical Generation of Noiseless Quantum Subsystems," Feb. 25, 2000, http://xxx.lanl.gov/PS_cache/quant-ph/pdf/0002/0002072.pdf pp. 1-4.

Zanardi, "Stabilizing Quantum Information," Sep. 6, 2000, http://xxx.lanl.gov/PS_cache/quant-ph/pdf/9910/9910016.pdf pp. 1-5.

Gottesman, "A Theory of Fault-Tolerant Quantum Computation," Feb. 17, 1997, http://xxx.lanl.gov/PS_cache/quant-ph/pdf/9702/9702029.pdf pp. 1-30.

Lindblad, "On the Generators of Quantum Dynamical Semigroups," Commun. Math. Phys. vol. 48, pp. 119-130, 1976.

De Filippo, "Quantum Computation Using Decoherence-Free States of the Physical Operator Algebra," Aug. 7, 2000, http://xxx.lanl.gov/PS_cache/quant-ph/pdf/9910/9910005.pdf pp. 1-16.

Landsman, "Lecture Notes on C*-algebras, Hilbert C*-modules and Quantum Mechanics," Jul. 24, 1998, http://xxx.lanl.gov/PS_cache/math-ph/pdf/9807/9807030.pdf pp. 1-89.

Kraus, States, Effects, and Operations: Fundamental Notions of Quantum Theory (Academic, Berlin, 1983).

Paz et al., "Continuous Error Correction," Jul. 24, 1997, http://xxx.lanl.gov/PS_cache/quant-ph/pdf/9707/9707049.pdf pp. 1-10.

Aharonov et al., "Fault-tolerant Quantum Computation with constant error rate," Jun. 30, 1999, http://xxx.lanl.gov/PS_cache/quant-ph/pdf/9906/9906129.pdf pp. 1-63.

Barenco et al., "Elementary Gates for Quantum Computation," Mar. 23, 1995, http://xxx.lanl.gov/PS_cache/quant-ph/pdf/9503/9503016.pdf pp. 1-31.

Dicke, "Coherence in Spontaneous Radiation Processes," Phys. Rev. vol. 93, No. 1, pp. 99-110, Jan. 1954.

Braunstein et al., Scalable Quantum Computers Paving the Way to Realization (Wiley—VCH, Berlin 2001).

DiVincenzo et al., "Quantum Computation and Spin Electronics," Nov. 16, 1999, http://xxx.lanl.gov/PS_cache/cond-mat/pdf/9911/9911245.pdf pp. 1-28.

Laflamme et al., "Perfect Quantum Error Correction Code," Feb. 27, 1996, http://xxx.lanl.gov/PS_ cache/quant-ph/pdf/9602/9602019.pdf pp. 1-4.

Gottesman, "Fault-Tolerant Quantum Computation with Local Gates," Mar. 30, 1999, http://xxx.lanl.gov/PS_cache/quant-ph/pdf/9903/9903099.pdf pp. 1-14.

Cahn, Semi-Simple Lie Algebras and Their Representations (Benjamin/Cummings, Reading, 1984), available online at http://www-physics.lbl.gov/~mcahn/book.html.

Bechmann-Pasquinucci et al., "Incoherent and coherent eavesdropping in the six-state protocol of quantum cryptography," Phys. Rev. A, vol. 59, No. 6, pp. 4238-4248, Jun. 1999.

DiVincenzo et al., "Quantum Channel Capacity of Very Noisy Channels," Nov. 3, 1998, http://xxx.lanl.gov/PS_cache/quant-ph/pdf/9706/9706061.pdf pp. 1-31. Erratum: Phys. Rev. A 59, 1717 (1999).

Kholevo, "Bounds for the quantity of information transmitted by a quantum communication channel," Probl. Inf. Transm. (U.S.S.R.), vol. 9, p. 177-183, 1973.

Inamori, "Security of EPR-based Quantum Key Distribution," Aug. 14, 2000, http://xxx.lanl.gov/PS_cache/quant-ph/pdf/0008/0008064.pdf pp. 1-20.

Inamori, "Security of EPR-based Quantum Key Distribution using three bases," Aug. 16, 2000, http://xxx.lanl.gov/PS_cache/quant-ph/pdf/0008/0008076.pdf pp. 1-12.

Lamas-Linares et al., "Experimental Quantum Cloning of Single Photons," Science, vol. 296, pp. 712-714, Apr. 26, 2002.

Lutkenhaus, "Estimates for practical quantum cryptography," Phys. Rev. A, vol. 59, No. 5, pp. 3301-3319, May 1999.

Wiesner, "Conjugate Coding," Sigact News, vol. 15, No. 1, pp. 78-89, 1983.

Gottesman, Ph.D. thesis, "Stabilizer Codes and Quantum Error Correction," May 28, 1997, http://xxx.lanl.gov/abs/quant-ph/9705052 pp. 1-114.

Brown et al., "Characterization of silicon avalanche photodiodes for photon correlation measurements. 1: Passive quenching," Appl. Opt. vol. 25, No. 22, pp. 4122-4126, Nov. 15, 1986.

Brown et al., "Characterization of silicon avalanche photodiodes for photon correlation measurements. 2: Active quenching," Appl. Opt. vol. 26, No. 12, pp. 2383-2389, Jun. 15, 1987.

Bourennane et al., "Experiments on long wavelength (1550nm) "plug and play" quantum cryptography systems," Optics Express vol. 4,No. 10, pp. 383-387, May 1999.

Karlsson et al., "A Single-Photon Counter for Long-Haul Telecom," Circuits and Devices vol. 11, pp. 34-40, Nov. 1999.

Bourennane et al., "Experimental long wavelength quantum cryptography: from single photon transmission to key extraction protocols," J. Mod. Opt. vol. 47, No. 2/3, pp. 563-579, 2000.

Stefanov et al., "Optical Quantum Random Number Generator," Jul. 2, 1999, http://xxx.lanl.gov/PS_cache/quant-ph/pdf/9907/9907006.pdf pp. 1-4.

von Neumann, "Various Techniques Used in Connection with Random Digits," Applied Math Series, 12, US National Bureau of Standards, Wash. D.C., pp. 36-38, 1951.

Elias, "The Efficient Construction of an Unbiased Random Sequence," The Annals of Mathematical Statistics vol. 43, No. 3, pp. 865-870, 1972.

Peres, "Iterating Von Neumann's Procedure for Extracting Random Bits," Annals of Statistics, vol. 20, Issue 1, pp. 590-597, Mar. 1992.

Dautet et al., "Photon counting techniques with silicon avalanche photodiodes," Applied Optics vol. 32, No. 21, pp. 3894-3900, Jul. 30, 1993.

Ribordy et al., "performance of InGaAs/InP avalanche photodiodes as gated-mode photon counters," Applied Optics vol. 37, No. 12, pp. 2272-2277, 1998.

Yurke, "Wideband photon counting and homodyne detection," Physical Review A, vol. 32, No. 1, pp. 323, Jul. 1985.

Buttler et al., "Daylight Quantum Key Distribution over 1.6 kn," Physical Review Letters, vol. 84, No. 24, pp. 5652-5655, Jun. 2000.

Shor, "Polynomial—Time Algorithms for Prime Factorization and Discrete Logarithms on a Quantum Computer," Jan. 25, 1996, http://aps.arxiv.org/PS_cache/quant-ph/pdf/95080/9508027.pdf pp. 1-28.

Boneh et al., Quantum Cryptanalysis of Hidden Linear Functions (Extended Abstract), pp. 1-28, 1995.

Cleve et al., "Fast parallel circuits for the quantum Fourier transform," Jun. 1, 2000, http://aps.arxiv.org/PD_cache/quant-ph/pdf/00060/0006004.pdf pp. 1-22.

Knill et al., "Efficient Linear Optics Quantum Computation," Jun. 20, 2000, http://xxx.lanl.gov/PS_cache/quant-ph/pdf/0006/0006088.pdf pp. 1-8.

Cleve et al., "Fast parallel circuits for the Quantum Fourier Transform," available online: http://xxx.lanl.gov/abs/quant-ph/0006004 pp. 1-22.

Raussendorf et al., "The one-way quantum computer—a non-network model of quantum computation," Aug. 27, 2001, http://xxx.lanl.gov/abs/quant-ph/0108118 pp. 1-7.

Cleve et al., "Quantum Algorithms Revisited," Aug. 8, 1997, http://xxx.lanl.gov/abs/quant-ph/9708016 pp. 1-7.

Briegel et al., "Quantum Repeaters: The Role of Imperfect Local Operations in Quantum Communication," Phys. Rev. Lett. vol. 81, No. 26, pp. 5932-5935, Dec. 1998.

Cirac et al., "Quantum state transfer and entanglement distribution among distant nodes in a quantum network," Phys. Rev. Lett. vol. 78, No. 16, pp. 3221-3224, Apr. 1997.

van Enk et al., "Photonic channels for quantum communication," Science vol. 279, pp. 205-208, Jan. 1998.

Muller et al., "Plug and play systems for quantum cryptography," Appl. Phys. Lett. vol. 70, No. 7, pp. 793-795, Feb. 1997.

Lidar et al., "Decoherence-Free Subspaces for Multiple-Qubit Errors: (II) Universal, Fault-Tolerant Quantum Computation," Jul. 5, 2000, http://xxx.lanl.gov/PS_cache/quant-ph/pdf/0007/0007013.pdf pp. 1-26.

Duan et al., "Long-distance quantum communication with atomic ensembles and linear optics," May 22, 2001, http://xxx.lanl.gov/PS_cache/quant-ph/pdf/0105/0105105.pdf pp. 1-8.

Kok et al., "Long-distance quantum communications just around the corner?" Quantum Information and Computation, vol. 1, No. 3, pp. 87-88, 2001.

Knill et al., "Quantum Computation and Quadratically Signed Weight Enumerators," Sep. 30, 1999, http://aps.arxiv.org/PS_cache/quant-ph/pdf/99090/9909094.pdf pp. 1-7.

Maurer, "Protocols for Secret Key Agreement by Public Discussion Based on Common Information," Advances in Cryptology—Proceedings of Crypto' 92, Springer-Verlag, vol. 740, pp. 461-470, (1993).

Duan et al., "Long-distance quantum communication with atomic ensembles and linear optics: Supplementary Information," May 22, 2001, http://xxx.lanl.gov/PS_cache/quant-ph/pdf/0105/0105105.pdf pp. 1-8.

Klarrreich, "Can you keep a secret?" Nature, vol. 418, Jul. 18, 2002, pp. 270-272.

Rash, "Not just sci-fi: Uncrackable encryption," Tech Update, Apr. 17, 2002 http://www.zdnet.com/filters/printerfriendly/0,6061,2861716-92,00.html pp. 1-2.

Fisher, "Experts Debate Risks to Crypto," eWeek, Mar. 27, 2002 http://www.eweek.com/print_article/0,3668,a=24663,00.asp pp. 1-2.

Smalley, "Future Tech: Hack-Proof Chatting," Discover vol. 23 No. 5, May 2002, http://www.discover.com/may_02/feattech.html pp. 1-4.

McDonald, "Quantum Computing Puts Encrypted Messages at Risk," NewsFactor Network, Jul. 8, 2002 http://www.newsfactor.com/perl/story/18490.html pp. 1-4.

Metz, "Special Report: Quantum Cryptography Arrives," PC Magazine, Aug. 6, 2002 http://www.pcmag.com/print_article/0,3048,a=29842,00.asp pp. 1-5.

Costello, "Will Aussie teleportation new improve cryptography?" IDG News Service\Boston Bureau, Jun. 19, 2002, pp. 4-5.

Maurer et al., "Unconditionally secure Key Agreement and the Intrinsic Conditional Information," IEEE Trans. Inf. Theory vol. 45, No. 2, 499-514, Mar. 1999.

Shor et al., "Simple proof of Security of the BB84 quantum key distribution protocol," Phys. rev. Lett. vol. 85, No. 2, pp. 441-444, Jul. 2000.

Mayers, "Unconditional security in quantum cryptography," Journal of the ACM, vol. 48, No. 3, pp. 351-406, May 2001.

Bennett et al., "Quantum cryptography: Public key distribution and coin tossing," Proceedings of IEEE International Conference on Computers, Systems, and Signal Processing, IEEE, pp. 175-179, Dec. 1984.
Ekert, "Quantum cryptography based on Bell's Theorem, " Phys. Rev. Lett. vol. 67, pp. 661-663, Aug. 1991.
Bennett et al., "Mixed-state entanglement and quantum error correction," Phys. Rev. A, vol. 54, No. 5, pp. 3824-3851, Nov. 1996.
Bennett et al., "Purification of Noisy Entanglement and Faithful Teleportation via Noisy Channels," Phys. Rev. Lett., vol. 76, No. 5, pp. 772-725, Jan. 1991.
Deutsch et al., "Quatrum Privacy Amplification and the Security of Quantum Cryptography over Noisy Channels," Phys. Rev. Lett. 77, 2818-2821, Sep. 1996; 80, No. 9, 2022, Mar. 1998 errata.
Mayers, preprint of, "Unconditional security in Quantrum Cryptography, " Sep. 15, 1998, http://xxx.lanl.gov/PS_cache/quant-ph/pdf/9802/9802025.pdf pp. 1-18.
Lo et al., "Unconditional security of quantum key distribution over arbitrarily long distances," Science, vol. 283, (1999), pp. 2050-2056; also available at http://xxx.lanl.gov/PS_cache/quant-ph/pdf 9803/980226. pdf pp. 1-213.
Biham et al., "A proof of security of quantum key distribution," Dec. 11, 1999, http://aps.arxiv.or/PS_cache/quant-ph/pdf/9912/9912053.pdf 31 pages.
Inamori et al., "unconditional Security of Practical Quantum Key Distribution," Jul. 3, 2001 http://xxx.lanl.gov/PS_cache/quant-ph/pdf/0107017.pdf pp. 1-47.
Gottesman et al., "Proof of security of quantum key distribution with two-way classical communications," May 23, 2001, http://xxx.lanl.gov/PS_cache/quant-ph/pdf/0105/0105121.pdf pp. 1-17.
Lo, "Proof of unconditional security of six-state quantum key distribution scheme," Quantum Information and Computation, vol. 1, No. 2, pp. 81-94, 2001.
Bennett et al., "generalized Privacy Amplification," IEEE Transactions on Information Theory, vol. 41, No. 6, pp. 1915-1923, Nov. 1995).
Bruss, "Optimal eavesdropping in quantrum cryptography with six states," Phys. Rev. Lett., vol. 81, No. 14, pp. 3018-3021, Oct. 1998.
Lo et al., "Efficient quantum key distribution scheme and proof of its unconditional security," Nov. 30, 2001, http://xxx.lanl.gov/PS_cache/quant-ph/pdf/0011/0011056.pdf pp. 1-32.
Gottesman et al., "Secure quantum key distribution using squeezed states," Sep. 25, 2000, http://xxx.lanl.gov/PS_cache/quant-ph/pdf/0008/0008046.pdf pp. 1-19.
Calderbank et al., "Good Quantrum error-correcting codes exist," Apr. 16, 1996, http://aps.arxiv.org/PS_cache/quant-ph/pdf/9512/9512032.pdf pp. 1-24.
Steane, "Multiple particle interference and quantum error correction," May 13, 1996, http://aps.arxiv.org/PS_cache/quant-ph/pdf/9601/9601029.pdf pp. 1-45.
van Dam et al., "Quantum Algorithms for some Hidden Shift Problems," Nov. 21, 2002, http://xxx.lanl.gov/abs/quant-ph/0211140, pp. 1-12.
Moore et al., "The Hidden Subgroup in Affine Groups: Basis Selection in Fourier Sampling," Nov. 26, 2002, http://xxx.lanl.gov/abs/quant-ph/0211124, pp. 1-11.
Hallgren, "Polynomial-Time Algorithms for Pell's Equation and the Principal Ideal Problem," Oct. 3, 2002, http://www.cs.caltech.edu/~hallgren/pell.pdf, pp. 1-12.
Lidar et al., "Encoded Recoupling and Decoupling; An Alternative to Quantum Error Correcting Codes, Applied to Trapped Ion Quantum Computation," Nov. 15, 2002, http://xxx.lanl.gov/abs/quant-ph/0211088, pp. 1-12.
Shiokawa et al., "Dynamical Decoupling Using Slow Pulses: Efficient Suppression of 1/f Noise," Nov. 15, 2002, http://xxx.lanl.gov/abs/quant-ph/0211081, pp. 1-5.
Byrd et al., "Combined Error Correction Techniques for Quantum Computing Architectures," Oct. 10, 2002, http://xxx.lanl.gov/abs/quant-ph/0210072, pp. 1-9.
Wu et al., "Universal Quantum Computation using Exchange Interactions and Teleportation of Single-Qubit Operations," Aug. 17, 2002, http://xxx.lanl.gov/abs/quant-ph/0208118, pp. 1-5.
Khodjasteh et al., "Universal Fault-Tolerant Quantum Computation in the Presence of Spontaneous Emission and Collective Dephasing," Oct. 11, 2002, http://xxx.lanl.gov/abs/quant-ph/0206025, pp. 1-4.
Byrd et al., "Empirical Determination of Bang-Bang Operations," May 24, 2002, http://xxx.lanl.gov/abs/quant-ph/0205156, pp. 1-14.
Lidar et al., "Quantum Codes for Simplifying Design and Suppressing Decoherence in Superconducting Phase-Qubits," Sep. 4, 2002, http://xxx.lanl.gov/abs/cond-mat/0204153, pp. 1-15.
Wu et al., "Efficient Universal Leakage Elimination for Physical Encoded Qubits," Feb. 27, 2002, http://xxx.lanl.gov/abs/quant-ph/0202168, pp. 1-4.
Wu et al., "Universal Quantum Logic from Zeeman and Anisotropic Exchange Interactions," Oct. 2, 2002, http://xxx.lanl.gov/abs/quant-ph/0211135, pp. 1-5.
Wu et al., "Creating Decoherence-Free Subspaces Using Strong and Fast Pulses," Apr. 10, 2002, http://xxx.lanl.gov/abs/quant-ph/0112144, pp. 1-4.
Byrd et al., "Comprehensive encoding and decoupling solution to problems of decoherence and design in solid-state quantum computing," Jun. 18, 2002, http://xxx.lanl.gov/abs/quant-ph/0112054, pp. 1-5.
Byrd et al., "Bang-Bang Operations from a Geometric Perspective," Oct. 25, 2001, http://xxx.lanl.gov/abs/quant-ph/0110121, pp. 1-7.
Bihary et al., "An Implementation of the Deutsch-Jozsa Algorithm on Molecular Vibronic Coherences Through Four-Wave Mixing: a Theoretical Study," Aug. 20, 2002, http://xxx.lanl.gov/abs/quant-ph/0110041, pp. 1-14).
Wu et al., "Qubits as Parafermions," May 28, 2002, http://xxx.lanl.gov/abs/quant-ph/0109078, pp. 1-17.
Lidar et al., "Reducing Constraints on Quantum Computer Design by Encoded Selective Recoupling," Dec. 20, 2001, http://xxx.lanl.gov/abs/quant-ph/0109021, pp. 1-5.
Wu et al., "Polynomial-Time Simulation of Pairing Models on a Quantum Computer," Jun. 19, 2002, http://xxx.lanl.gov/abs/quant-ph/0108110, pp. 1-5.
Brown et al., "Quantum Computing with Quantum Dots on Quantum Linear Supports," May 22, 2001, http://xxx.lanl.gov/abs/quant-ph/0105102, pp. 1-26.
Wu et al., "Power of Anisotropic Exchange Interactions: Universality and Efficient Codes for Quantum Computing," Nov. 14, 2001, http://xxx.lanl.gov/abs/quant-ph/0103039, pp. 1-5.
Bacon et al., "Encoded Universality in Physical Implementations of a Quantum Computer," Apr. 13, 2001, pp. 1-6.
Zadoyan et al., The manipulation of massive ro-vibronic superpositions using time-frequency-resolved coherent anti-Stokes Raman scattering (TFRCARS): from quantum control to quantum computing, http://xxx.lanl.gov/abs/physics/0102091, pp. 1-59.
Vala et al., "Encoded Universality for Generalized Anisotropic Exchange Hamiltonians," Apr. 4, 2002, http://xxx.lanl.gov/abs/quant-ph/0204016, pp. 1-15.
Kempe et al., "Exact gate-sequences for universal quantum computation using the XY-interaction alone," May 23, 2002, http://xxx.lanl.gov/abs/quant-ph/0112014, pp. 1-11.
Kempe et al., "Encoded Universality from a Single Physical Interaction," Dec. 3, 2001, http://xxx.lanl.gov/abs/quant-ph/0112013, pp. 1-20.

* cited by examiner

QUANTUM COMPUTATION

CROSS-REFERENCE TO RELATED APPLICATIONS

This application claims priority to U.S. provisional application No. 60/283,016, filed Apr. 11, 2001. The contents of that provisional application are incorporated herein by reference.

DISCUSSION OF THE BACKGROUND

1. Field of the Invention

This invention relates to computation, and more specifically to quantum cryptography and quantum computing.

2. Discussion of the Background

Quantum mechanical systems have been investigated for many applications including quantum cryptography and quantum computation. Information may be stored and processed in such a quantum system. Often the information is carried by two-state quantum subsystems. Each two-state quantum subsystem is called a quantum bit ("qubit"). Such quantum mechanical processing systems may outperform classical computers in such tasks as prime factorization problems.

Physical implementations of qubits have the problem that the quantum system which carries the information are coupled to the environment. This leads to a process known as decoherence in which encoded quantum information is lost to the environment. U.S. Pat. No. 6,128,764 to Gottesman discusses quantum cryptography and quantum computation.

In order to remedy this problem, active quantum error-correcting codes (QECCs) have been developed in analogy with classical error correction. These codes encode quantum information over an entangled set of code words the structure of which serves to preserve the quantum information when frequent measurements of the errors and correction of any resulting errors are done.

One major development in the formulation of QECC has been the advent of stabilizer code theory. In this formalism, a set of stabilizer operators is defined, and the code is the common eigenspace of the stabilizer elements with eigenvalue +1.

The decoherence-free subsystem (DFS) approach is another method that has been developed to combat decoherence resulting from a specific decoherence mechanism. In contrast to the active mode of QECC, the DFS approach utilizes the symmetry of the system-environment coupling to find a subspace of the system which does not experience decoherence. The quantum information the user wishes to encode in the system is expressed by means of states contained in the decoherence-free subsystem.

The inventors recognized that, from the perspective of quantum computation, it is also important to be able to controllably transform decoherence-protected states. Once the information encoded in the quantum system has been protected from decoherence by some method such as a DFS, it is useful to be able to perform universal quantum computation. The idea of universal computation is the following: with a restricted set of operations called a universal set, one wishes to implement any unitary transformation on the given Hilbert space to an arbitrary degree of accuracy. There are a number of universal sets that have been identified.

SUMMARY OF THE INVENTION

It is an object of the invention to provide improved quantum computation.

It is another object of the invention to provide improved decoherence free quantum computation.

These and other objects of the invention are provided by a system and method for quantum computation comprising the steps of defining a Hilbert space to represent a physical quantum mechanical system; selecting a set of quantum observables for said system; selecting a subspace of said Hilbert space in which all states representing said quantum mechanical system have the same eigenvalue; and storing information in or processing information using said subspace.

The objects are also provided by a system and method for quantum computation comprising defining a Hilbert space to represent a physical quantum mechanical system; selecting a subspace of said Hilbert space in which the quantum mechanical state of the physical system is decoherence free; and processing quantum information using the quantum mechanical system by controlling only multi body interactions.

In accordance with the present invention, an apparatus and method are described for forming a decoherence-free subsystem based on finding a set of quantum observables. These quantum observables are determined based on the primary mechanism for decoherence in the system. The Hilbert space is then divided up into subspaces according to the eigenvalues of these observables. A specific simultaneous subspace with eigenvalue +1 for all said quantum observables is selected as the decoherence free subsystem.

Physical systems for implementing quantum computing include NMR machines, quantum optics, superconducting electronics, quantum-dot physics, electrons flowing on Helium, and silicon systems. See for example S. L. Braunstein and H.-K. Lo, "Scalable quantum computers, paving the way to realization", Wiley-VCH, 2001, the teachings of which are incorporated herein by reference.(See http://www.wiley-vch.de/books/tis/eng/3-527-40321-3.html).

The invention also provides an apparatus and method for performing universal quantum computation on the DFS by controlling only multi-body interactions in the physical system.

Stabilizers are used to identify a set of Hamiltonians which are composed to find a universal set of gates on the DFS-encoded system. This universal set is then used to approximate any gate on the encoded system; these gates have the property that when applied to a state in the DFS, the state never leaves during the entire time that the gate is applied.

The invention further provides an apparatus and method for performing universal quantum computation under a particular ubiquitous form of decoherence mechanism called strong collective decoherence (SCD), in which stabilizers are used as above to derive a set of Hamiltonians called two-body exchange operators. Arbitrary gates acting on the DFS states are constructed using these exchange operators such that the states never leave the DFS during the entire process of applying the gate.

A preferred example of an apparatus forming a physical embodiment of a decoherence-free subsystem, for performing universal quantum computation on the DFS, and for performing universal quantum computation using strong collective decoherence (SCD) is a nuclear magnetic resonance apparatus enclosing a molecule wherein the molecule has n magnetically distinct spin states, and a controller for providing predetermined sequences of pulse of various frequencies, power levels, and durations intended to excite the nuclei of the molecule into any state inside the 2**n dimensional Hilbert space that describes the state of the physical system.

BRIEF DESCRIPTION OF THE DRAWINGS

The invention will be described with reference to the following drawings.

DETAILED DESCRIPTION OF THE PREFERRED EMBODIMENTS

Figure 1:
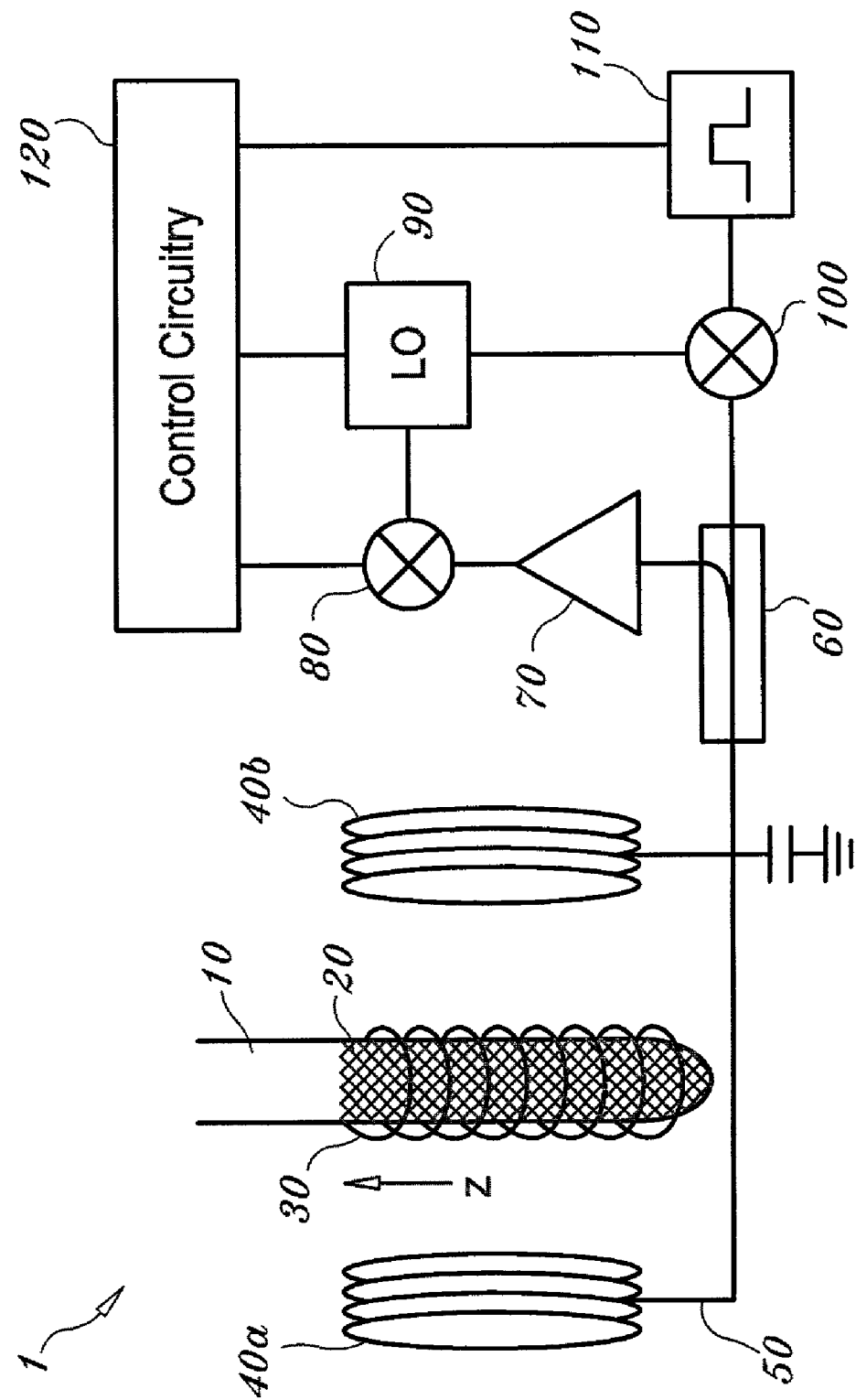
FIG. 1 is a schematic showing a NMR system for performing universal quantum computation on the DFS, and SCD.

FIG. 1 is a schematic showing a NMR system for performing universal quantum computation on the DFS, and SCD.

FIG. 1 shows NMR apparatus 1 including NMR sample holder 10, sample 20, Bo field coils 30, B1 field coils 40a, 40b, signal transmission line 50, input/output coupler 60, amplifier 70, mixer 80, local oscillator 90, power mixer 100, pulse train signal 110, and control circuitry 120.

In operation, sample 20 contains a molecule (or a large number of the same molecule) having N magnetically distinct nuclear spins. Each spin may be of spin-1/2 and represents a qubit (i.e., quantum bits). Therefore, the N nuclear spins represent N qubits. The wave function of the N qubits, therefore, lives (or is defined in) in a 2n dimensional Hilbert spaces. DC magnetic field Bo is applied by coil 30. Control circuitry 120 generates pulse train signal 110. Pulses train signal 110 is converted by power mixer 100 to a signal of suitable frequency and power to provide induce current in coils 40a, 40b. The current induced in coils 40a, 40b generates a magnetic field at the location of the molecule. The nuclear spin of the molecule in sample 20 reacts to the magnetic field wave form by changing state. The change in state of the molecule may be detected by measuring power transmitted back from coils 40a, 40b, through coupler 60, amplifier 70, and mixer 80 to control circuitry 120. In essence, the n nuclear spins of the molecule can be used as a storage device for quantum information that represents a wave function living in a 2n dimensional physical Hilbert space. (In an actual NMR quantum computing, labeling (also referred to as encoding) may reduce the actual number of *computational* qubits that are represented by the n physical nuclear spins in a molecule. See Braunstein and Lo, supra, for details.) The spin state of the molecule as described above is analogous to an n-bit register that can represent an n-bit number (i.e., an element in a finite field in number theory) in a conventional computer, which is a physical system. In quantum computing, controlled interactions acting on the n nuclear spin can lead to a corresponding controlled quantum logical operation acting on the wave function of the 2**n dimensional Hilbert space. This is somewhat analogous to a conventional digital computer where controlled physical interactions will lead to a controlled logical operation on the state of the n-bit register. The main difference is that quantum information lives in (or is defined with respect to) a Hilbert space, which is a much larger space than the space of n bits. Therefore, quantum computing with a physical system of n qubits offers more computing power than conventional digital computing with a physical system of similar physical size, namely, n bits.

The theory and experiment of NMR quantum computing has recently been discussed in scientific papers. See, for example, S. L. Braunstein and H.-K. Lo, "Scalable quantum computers, paving the way to realization", Wiley-VCH, 2001.

The decoherence-free subsystem presented in this disclosure can be modeled as a system S coupled to a bath B. The system will represent the quantum device in which information is to be stored and processed, while the bath represents the environment to which the quantum device is coupled. The interaction between the system and the bath is characterized by the Hamiltonian $H=H_S I_B + I_S H_B + H_I$. Here $H_S(H_B)$ is the system (bath) Hamiltonian that acts on the system (bath) Hilbert space $H_S(H_B)$, $I_S(I_B)$ is the identity operator on the system (bath) Hilbert space, and $H_I$ is the interaction Hamiltonian containing all the nontrivial couplings between system and bath. This interaction Hamiltonian can be written generally as the sum of operations which act separately on the system ($S_\alpha$) and on the bath ($B_\alpha$): $H_I = \Sigma S_\alpha B_\alpha$. This interaction Hamiltonian, over time, mixes information encoded in the system S with states in the bath B; thus monitoring of the system shows a loss of information. To reflect this, the $S_\alpha$ will be referred to as the error operators on the system. This leakage of quantum information from the system to the bath is the decoherence process against which a DFS will protect.

Stabilizer Formalism

Figure 2:
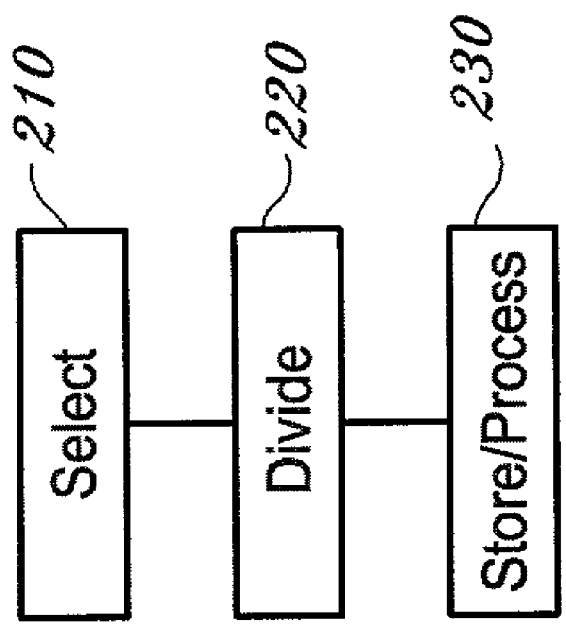
FIG. 2 is a flowchart showing operation steps in forming a decoherence-free subsystem based on stabilizer formalism.

FIG. 2 is a flowchart showing the primary operation steps in forming such a decoherence-free subspace using the method of stabilizer codes. At step 210, a set of quantum observables is selected, as will be explained subsequently, to be the stabilizer group that acts on quantum states in the Hilbert space of the quantum system under consideration. At step 220, the Hilbert space is divided up into subspaces according to the eigenvalues of the quantum observables selected in step 210, and a specific subspace corresponding to the eigenspace in which all the elements of the stabilizer group simultaneously have eigenvalue +1 is chosen to be the decoherence-free subsystem (DCF). Finally, in step 230, information is stored or processed in such a DCF subsystem, by means of a set of states encoding the information which are chosen so that they lie in the decoherence-free subsystem. The fact that the information is in a DCF subsystem defined by 220 means that the information is protected against any errors generated by the stabilizer group found in 210, and in addition can detect error operators that do not commute with at least one of that stabilizer group.

It is important to be able to choose the stabilizer group in step 210 given a particular set of error operators $\{S_\alpha\}$. This selection is done by noting some features of a DFS. A DFS is defined as a subsystem of the quantum system under consideration such that the system evolves unitarily under the error operators. It is possible to show that a DFS is completely specified by the following condition: $|\mu\rangle|\lambda\rangle$ is in the DFS if and only if $S_\alpha|\mu\rangle|\lambda\rangle = |\mu\rangle M_\alpha|\lambda\rangle$ (eqn1). The DFS stabilizer D(v) which stabilizes the DFS with eigenvalue +1 is $$D(\vec{v}) = D(v_1, \ldots, v_N) = \exp\left[\sum_\alpha v_\alpha (S_\alpha - I \otimes M_\alpha)\right]$$

for all complex $v_\alpha$.

The following will show that D(v) is the DFS stabilizer. The DFS condition implies that the D(v) stabilize the DFS:

$$\overset{p}{D(v)}|\mu\rangle \otimes |\lambda\rangle = |\mu\rangle \otimes |\lambda\rangle.$$

Moreover, $$\overset{p}{D(v)}|\mu\rangle \otimes |\lambda\rangle = |\mu\rangle \otimes |\lambda\rangle$$

for all complex v implies that $|\mu\rangle|\lambda\rangle$ is in the DFS. This is because it follows from the definition of the above stabilizer that $D(0,0,\ldots 0, v_\beta,0,\ldots,0)|\mu\rangle|\lambda\rangle=|\mu\rangle|\lambda\rangle$. By picking $v_\beta$ to be very small, it follows that $$\overset{p}{D(v)}|\mu\rangle \otimes |\lambda\rangle - |\mu\rangle \otimes |\lambda\rangle = v_\beta(S_\beta - I \otimes M_\beta)|\mu\rangle \otimes |\lambda\rangle$$

up to some additive factor which can be made as small as wished, which shows that D(v) is the stabilizer which stabilizes the DFS given by the condition (eqn1). Therefore, we can pick such a stabilizer set as above, and as in step 220, a state belongs to the DFS if and only if the state belongs to the simultaneous eigenspace of the stabilizer set with eigenvalue +1.

Universal Quantum Computation

One result of constructing a DFS using the stabilizer method is that it helps elucidate a protocol for performing information processing on the DFS-encoded states as in 230. Arbitrary gates are constructed, wherein the states upon which the gates act stay within the DFS at all times, so that the performance of the gate does not result in decohering the state.

FIG. 1 shows a quantum device for information processing that implements universal computation in accordance with the method just describe with reference to FIG. 2. The molecule is the quantum medium comprised of a quantum system and its surrounding environment, or bath, where the quantum system has many subsystems with at least two quantum states each. The NMR apparatus surrounding the molecule/medium controls the quantum states in the medium by applying the gates as per steps 220, 230.

Figure 3:
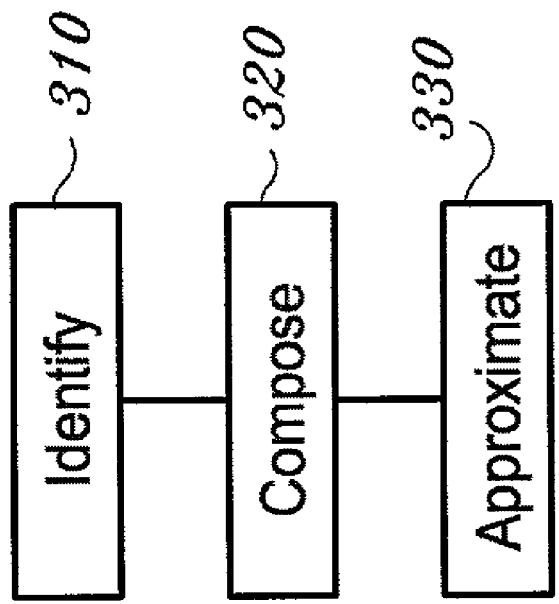
FIG. 3 is a flowchart showing construction of an arbitrary gate acting on the decoherence-free subsystem that never takes states out of the said subsystem.

FIG. 3 is a flow chart showing steps for approximating any gates on encoded states of the system.

In step 310, the stabilizer set is used to identify a set of Hamiltonians $\{H_t\}$ such that these Hamiltonians, when acting on a state in the DFS for a specified time, keep that state within the DFS for the entire switching time of the gate. In step 320, the $\{H_t\}$ are composed to find a universal set of gates on the DFS-encoded states. Finally, in step 330, the universal set is used to approximate any gate on the encoded states.

The procedure used to approximate any gate on the encoded states is to note that if a unitary gate U takes states in the DFS to other states in the DFS, $$U\overset{p}{D(v)}U^+ = \overset{p}{D(v')}$$

for all v. Then the condition that U and D commute, UD=DU, is certainly a sufficient condition for the unitary gate U to preserve the DFS. These unitaries are physically implemented by turning on a Hamiltonian H for a certain time t: $U(t)=e^{iHt}$. The stabilizer set is further important to identify the more restrictive set of Hamiltonians that not only preserve the DFS at the conclusion of the gate operation, as do the commuting U's above, but also preserve the DFS throughout the entire duration of the gate operation. Taking the derivative of $U(t)D(v)=D(v)U(t)$ with respect to time and evaluating the resulting equation at $t=0$ gives a sufficient condition to identify the Hamiltonians of interest in step 202: the Hamiltonians H such that HD=DH.

Universal Quantum Computation Inside SCD-DFS

An important design consideration is the choice for the quantum medium, such as the molecule and its nuclear spin states in FIG. 1. It is important for the quantum medium to have the right kind of decoherence mechanism in order to implement the DFS-stabilizer construction in FIGS. 2 and 3. This mechanism should take the form of collective decoherence, in which there is some symmetry of the interaction with the environment.

A particularly useful decoherence mechanism for the quantum medium is one where the bath cannot distinguish the system qubits. The interaction Hamiltonian describing this mechanism is most easily expressed by defining the Pauli operators $$\sigma_x = \begin{pmatrix} 0 & 1 \\ 1 & 0 \end{pmatrix}, \quad \sigma_y = \begin{pmatrix} 0 & -i \\ i & 0 \end{pmatrix}, \quad \sigma_z = \begin{pmatrix} 1 & 0 \\ 0 & -1 \end{pmatrix}$$

in the basis spanned by $\sigma_z$ eigenstates $|0\rangle$ and $|1\rangle$. It is now possible to define the collective operators $$S_\alpha \equiv \sum_{j=1}^{n} \sigma_\alpha^j.$$

Here $\sigma_\alpha^j$ denotes a tensor product of the identity on all but the jth qubit and the αth Pauli matrix on the jth qubit, where α=x,y,z. For n qubits interacting with a bath, the most general interaction Hamiltonian linear in the $\sigma_\alpha^j$ can be written as $$H_I = \sum_{i=1}^{n} \sum_{\alpha=x,y,z} \sigma_\alpha^i \otimes B_{i,\alpha},$$

where the $B_{i,\alpha}$ are bath operators. If the bath cannot distinguish the system qubits, $B_{i,\alpha}$ should not depend on i. Then the interaction Hamiltonian for the case in which the bath cannot distinguish the system qubits can be written as $$H_I = \sum_{\alpha=x,y,z} \sigma_\alpha^j \otimes B_\alpha.$$

Collective decoherence mechanisms for which this interaction Hamiltonian holds will be called strong collective decoherence or SCD.

The situation in which the bath is the electromagnetic field approximates this requirement, where the wavelength of the transition between the states of the qubits is larger than the spacing between the qubits. The electromagnetic field will then interact with each of these qubits in an identical manner, because the field strength over a single wavelength will not vary substantially. For condensed-phase ->

SCD is a useful decoherence mechanism because of the particular form of the error operators. The operators $\{S_\alpha\}$ acting on n qubits are mathematically equivalent to the total angular momentum operator for n spins that is frequently encountered in quantum mechanics; therefore, the same formalism used to describe angular momentum can be used in this case. This formalism says that the Hilbert space of n qubits can be decomposed into subsystems which correspond to different values of the total angular momentum, and states can be described in terms of their total angular momentum, J; the degeneracy of the decomposition for a given J, $\lambda$; and the $J_z$ value within the (J,$\lambda$)-subsystem, $\mu$. Such a state will therefore be described as $|J, \lambda, \mu\rangle$. From the theory of angular momentum it is easy to see that the error operators act as the identity on the $\lambda$ component, so a DFS is defined by fixing J and $\mu$. The DFSs corresponding to the different J values for a given n can be computed using standard methods for the addition of angular momentum. The convention used here will be that $|1\rangle$ represents a $|j=1/2, mj=1/2\rangle$ particle and $|0\rangle$ represents a $|j=1/2, mj=-1/2\rangle$ particle, though the labeling does not represent a physical angular momentum, as the $\{S_\alpha\}$ are not actually angular momentum operators.

The smallest n that supports a DFS and encodes at least a qubit of information is n=3. For this case there are two possible values of the total angular momentum: J=3/2 or J=1/2. The J=1/2 states have degeneracy 2. This degeneracy results from two ways to construct the J=1/2 state by adding angular momentum of three spins: one can add either a J=1 or J=0 state on the first two spins to the J=1/2 state on the third spin. The four J=1/2 states can encode one qubit through this degeneracy; the resulting DFS on three qubits will be denoted as $DFS_3(1/2)$. In the following equation, this encoding will be shown in several steps:

$$|0_L\rangle = \begin{cases} \left|\frac{1}{2}, 0, 0\right\rangle = |0, 0\rangle \otimes |1/2, -1/2\rangle = \frac{1}{\sqrt{2}}(|010\rangle - |100\rangle) \\ \left|\frac{1}{2}, 0, 1\right\rangle = |0, 0\rangle \otimes |1/2, +1/2\rangle = \frac{1}{\sqrt{2}}(|011\rangle - |101\rangle) \end{cases}$$

$$|1_L\rangle = \begin{cases} \left|\frac{1}{2}, 1, 0\right\rangle = \frac{1}{\sqrt{3}}\left(-\sqrt{2}|1, -1\rangle \otimes |1/2, 1/2\rangle + |0, 0\rangle \otimes |1/2, -1/2\rangle\right) = \frac{1}{\sqrt{6}}(-2|001\rangle + |010\rangle + |100\rangle) \\ \left|\frac{1}{2}, 1, 1\right\rangle = \frac{1}{\sqrt{3}}\left(-\sqrt{2}|1, +1\rangle \otimes |1/2, -1/2\rangle - |1, 0\rangle \otimes |1/2, +1/2\rangle\right) = \frac{1}{\sqrt{6}}(2|001\rangle + |010\rangle + |100\rangle) \end{cases}$$

(eqn)

In this equation, the first column indicates the grouping forming a logical qubit; the second uses the $|J, \lambda, \mu\rangle$ notation; the third uses tensor products of the state on the first two spins with the state on the third spin; and the fourth expands the states in terms of the single-particle $|j=1/2, mj=\pm 1/2\rangle$ basis using Clebsch-Gordon coefficients.

SCD is also a mechanism for which the universal computation scheme of FIG. 2 can be exhibited using only two-body exchange Hamiltonians. If the system is expressed in the basis $|J_1, \ldots, J_{n-1}, J; m_J\rangle$, where the $J_i$ express the angular momentum of the first i qubits, it can be shown from angular momentum formalism considerations that the errors $\{S_\alpha\}$ act only on the $m_J$ component: $S_\alpha|J_1, \ldots, J; m_J\rangle = |J_1, \ldots, J_{n-1}, J\rangle P_\alpha|m_\Theta\rangle$, where the $P_\alpha$ denote operators acting directly on the $|m_\Theta\rangle$ component of the DFS. Then the stabilizer for this system is $$D(v_x, v_y, v_z) = \exp\left[\sum_{\alpha=x,y,z} v_\alpha(S_\alpha - I \otimes P_n)\right].$$

The Hermitian two-body exchange interactions, which flip qubits i and j and leaves other states invariant, commute with the stabilizer: $E_{ij}=|k\rangle_i|l\rangle_j=|l\rangle_i|k\rangle_j$. They thus preserve the SCD DFS, and indeed are the operators which act on the smallest number of qubits that also preserve the DFS.

The following will examine whether these two-body exchange operators are sufficient for performing universal computation on the DFS. Explicitly calculating the action of exchanging the physical qubits i and j on the J=3/2 and J=1/2 states is straightforward using (eqn). These can be written in matrix form as follows:

$$E_{12} = \begin{pmatrix} 1 & 0 & 0 \\ 0 & -1 & 0 \\ 0 & 0 & 1 \end{pmatrix}, \quad E_{23} = \begin{pmatrix} 1 & 0 & 0 \\ 0 & 1/2 & -\sqrt{3}/2 \\ 0 & -\sqrt{3}/2 & 1/2 \end{pmatrix},$$

$$E_{13} = \begin{pmatrix} 1 & 0 & 0 \\ 0 & 1/2 & \sqrt{3}/2 \\ 0 & \sqrt{3}/2 & -1/2 \end{pmatrix}, \text{ where the}$$

rows and columns of these matrices are labeled by the basis elements $$\{|J=3/2,\lambda=0\rangle, |J=1/2,\lambda=0\rangle, |J=1/2,\lambda=1\rangle\}.$$

Therefore, the following linear combinations of these $\{E_{ij}\}$ act as the Pauli $\sigma_z$ and $\sigma_x$ respectively on $DFS_3(1/2)$ while annihilating the $DFS_3(3/2)$: $\frac{1}{2}(-E_{12}+E_{13}+E_{23})$ and $1/\sqrt{3}(E_{13}-E_{23})$. However, if it is possible to perform $\sigma_z$ and $\sigma_x$ on a two-state system, $\sigma_y$ can be performed; and these three matrices together with the identity generate all unitary gates on the system. Hence these two-body exchange operators indeed are sufficient for performing universal computation on this DFS. It is possible to show, using induction with the above argument as the base step, that two-body exchange operators are sufficient for performing universal computation on a DFS with any number of qubits larger than 2.

Although the present invention has been described in detail with reference to a few embodiments, various modifications and enhancements may be made without departing from the scope and spirit of the following claims.

The invention claimed is:

1. A method for quantum computation, comprising:
preparing a set of one or more qubits capable of storing quantum information in $2^n$ possible states or their superposition, wherein n is the number of qubits and $n \geq 1$, and wherein the qubit set is subject to a decoherence mechanism that could cause a loss of quantum information stored in some but not all of the states;
performing a quantum measurement of the qubit set to determine which of the $2^n$ states is/are not susceptible to decoherence from the decoherence mechanism; and
encoding and processing quantum information in one or more of the decoherence-free states of the set of qubit via either an electromagnetic interaction with the set of qubit or via controlling interactions between qubits.

2. The method of claim 1 wherein the set of qubits includes a single molecule capable of occupying n nuclear spin states.

3. The method of claim 1 wherein the decoherence mechanism is collective decoherence capable of acting equally upon all of qubits in the set of qubits, and wherein $n \geq 3$.

4. The method of claim 1 wherein processing the quantum information stored in the decoherence-free states includes subjecting the set of qubit to a magnetic field wave.

5. The method of claim 4, including subjecting the qubits to a qubit-qubit exchange interaction to perform universal quantum computation on the decoherence-free states.

6. The method of claim 5, including encoding information onto one or more of the decoherence-free qubit states using pulses of electromagnetic radiation.

7. The method of claim 1, wherein performing the quantum measurement includes detecting electromagnetic signals from the qubit set.

8. The method of claim 7, wherein the set of one or more qubits consists of a single molecule having n magnetically distinct nuclear spins that represents the n qubits, and including using a nuclear magnetic resonance (NMR) apparatus to perform the electromagnetic measurement and the electromagnetic interaction.

9. A system for quantum computation, comprising:
a qubit holder that operably holds a physical quantum mechanical system made up of a set of one or more qubits capable of storing quantum information in $2^n$ possible qubit states, wherein n is the number of qubits and $n \geq 1$;
magnetic field coils arranged relative to the qubit holder so as to be magnetically coupled to the set of qubits; and
control circuitry operably coupled to the magnetic field coils and adapted to (a) electromagnetically measure the qubit states to determine which, if any, qubit states are decoherence-free states, and (b) generate a pulse train signal that causes the magnetic field coils to generate a magnetic field at the location of the qubit set so as to cause a change in one or more of the decoherence-free states in order to more permanently store quantum information in the qubit set as compared to non-decoherence-free states.

10. The system of claim 9 wherein the magnetic field is adjusted so as to form quantum gates that operate on decoherence-free states.

11. The system of claim 9 wherein the set of qubits includes either spin 1/2 particles or a single molecule capable of occupying n nuclear spin states.

12. The system of claim 9 wherein the decoherence is collective decoherence, and wherein $n \geq 3$.

* * * * *

UNITED STATES PATENT AND TRADEMARK OFFICE
CERTIFICATE OF CORRECTION

PATENT NO.         : 7,184,555 B2
APPLICATION NO. : 10/118934
DATED                : February 27, 2007
INVENTOR(S)       : Whaley et al.

It is certified that error appears in the above-identified patent and that said Letters Patent is hereby corrected as shown below:

CLAIM 1, col. 9, line 15, delete the word "qubit" at the end of the sentence and insert therefore -- qubits --

CLAIM 1, col. 9, line 17, delete the word "qubit" at the beginning of the sentence and insert therefore -- qubits --

Signed and Sealed this

Twenty-fourth Day of April, 2007

JON W. DUDAS
*Director of the United States Patent and Trademark Office*